US012766923B2

(12) United States Patent
Park et al.

(10) Patent No.: US 12,766,923 B2
(45) Date of Patent: Oct. 20, 2026

(54) VEHICLE AIR CONDITIONER AND CONTROL METHOD THEREFOR

(71) Applicant: Hanon Systems, Daejeon (KR)

(72) Inventors: Hae Sik Park, Daejeon (KR); Sung Ho Kim, Daejeon (KR); In Hyeok Kim, Daejeon (KR); Dae Yeop Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/856,108

(22) PCT Filed: Jun. 20, 2023

(86) PCT No.: PCT/KR2023/008534
§ 371 (c)(1),
(2) Date: Oct. 11, 2024

(87) PCT Pub. No.: WO2024/025154
PCT Pub. Date: Feb. 1, 2024

(65) Prior Publication Data
US 2025/0249727 A1 Aug. 7, 2025

(30) Foreign Application Priority Data
Jul. 29, 2022 (KR) ........................ 10-2022-0094346

(51) Int. Cl.
*B60H 1/00* (2006.01)

(52) U.S. Cl.
CPC ..... *B60H 1/00921* (2013.01); *B60H 1/00828* (2013.01); *B60H 2001/006* (2013.01)

(58) Field of Classification Search
CPC ............ B60H 1/00921; B60H 1/00828; B60H 2001/006
See application file for complete search history.

(56) References Cited

U.S. PATENT DOCUMENTS

2008/0134715 A1* 6/2008 Lewis .................. B60H 1/2221 62/498
2011/0146320 A1* 6/2011 Tomiyama ........... B60H 1/3208 62/296

FOREIGN PATENT DOCUMENTS

DE 102013204322 9/2013
EP 1927490 6/2008
(Continued)

OTHER PUBLICATIONS

Machine English language translation of JPH0717241 to Nakao. Translated Mar. 2026 (Year: 1995).*
(Continued)

*Primary Examiner* — Cassey D Bauer
(74) *Attorney, Agent, or Firm* — NORTON ROSE FULBRIGHT US LLP

(57) ABSTRACT

Disclosed are a vehicle air conditioner and a control method therefor, the air conditioner masking the initial operating noise of an electric compressor with the operating sound of a BLDC blower motor, thereby reducing the noise heard by a user. The vehicle air conditioner cools and heats the interior space of a vehicle by using a refrigerant line including a compressor, an outdoor heat exchanger, an expansion means, and an evaporator, includes a blower wheel for blowing air into the interior space of the vehicle and a blower motor for rotating the blower wheel, and has a control unit for operating the compressor after delaying same until the blower motor reaches a minimum RPM, if the compressor is in a driving condition while the blower motor is turned on.

10 Claims, 5 Drawing Sheets

(56) References Cited

FOREIGN PATENT DOCUMENTS

| | | | | | |
|---|---|---|---|---|---|
| JP | H7-17241 | | * | 1/1995 | ............... B60H 1/32 |
| JP | H11129740 | A | | 5/1999 | |
| JP | 2007002816 | A | | 1/2007 | |
| JP | 2010100264 | A | | 5/2010 | |
| JP | 2010126136 | A | | 6/2010 | |
| JP | 2018008541 | A | * | 1/2018 | ................ F25B 1/00 |
| KR | 20130100715 | A | | 9/2013 | |

OTHER PUBLICATIONS

Machine English language translation of JP2018-8541 to Kurata et al. Translated Mar. 2026 (Year: 2018).*
International Search Report issued in PCT/KR2023/008534 on Sep. 26, 2023.

* cited by examiner

PRIOR ART

VEHICLE AIR CONDITIONER AND CONTROL METHOD THEREFOR

CROSS REFERENCE TO RELATED APPLICATIONS

This patent application is a national phase under 35 U.S.C. § 371 of International Patent Application No. PCT/KR2023/008534 filed Jun. 20, 2023, which claims the benefit of priority from Korean Patent Application No. 10-2022-0094346 filed Jul. 29, 2022, each of which is hereby incorporated herein by reference in its entirety for all purposes.

TECHNICAL FIELD

The present invention relates to a vehicle air conditioner and a control method therefor, and more specifically, to a vehicle air conditioner and a control method therefor which can reduce initial noise from an electric compressor when a BLDC blower motor is applied.

BACKGROUND ART

In general, a vehicle air conditioner includes a cooling system to cool an interior space of the vehicle and a heating system to heat the interior space of the vehicle. The cooling system changes the air, which flows over the exterior of an indoor heat exchanger from the indoor heat exchanger of a refrigerant cycle, into cold air by exchanging heat between the air and a refrigerant flowing inside an evaporator to cool the interior space of the vehicle. Moreover, the heating system changes the air, which flows over the exterior of a heater core from the heater core of a coolant cycle, into warm air by exchanging heat between the air and a coolant flowing inside the heater core to heat the interior space of the vehicle.

Meanwhile, besides the aforementioned vehicle air conditioner, a heat pump system which switches a flow direction of the refrigerant using a single refrigerant cycle to selectively perform cooling and heating has been applied. The heat pump system includes: an indoor heat exchanger installed inside an air conditioning case to exchange heat with air blown into the interior space of the vehicle; an outdoor heat exchanger for exchanging heat outside the air conditioning case; and a direction adjustment valve which can switch the flow direction of the refrigerant. Depending on the refrigerant flow direction adjusted by the direction adjustment valve, the indoor heat exchanger performs the function of a cooling heat exchanger when a cooling mode is activated, and functions as a heating heat exchanger when a heating mode is activated.

Referring to FIG. 1, the conventional heat pump system for a vehicle includes a compressor 30, an indoor heat exchanger 32, a first expansion valve 34, an outdoor heat exchanger 48, and an evaporator 60.

The compressor 30 sucks and compresses the refrigerant, and then, discharges the refrigerant into a high-temperature and high-pressure gaseous state. The indoor heat exchanger 32 heats the air by exchanging heat between the refrigerant discharged from the compressor 30 and the air passing through the indoor heat exchanger. The first expansion valve 34 expands the refrigerant passing through the indoor heat exchanger 32, and the outdoor heat exchanger 48 exchanges heat between the refrigerant passing through the first expansion valve 34 and outdoor air. The evaporator 60 cools the air by exchanging heat between the refrigerant with the air passing through evaporator.

The evaporator 60 and the indoor heat exchanger 32 are sequentially installed in an air flow direction inside the air conditioning case 10. Between the evaporator 60 and the indoor heat exchanger 32, a temperature door 12 is equipped to control the air temperature by adjusting an air flow volume between a warm air passage and a cold air passage. On one side of the air conditioning case 10, a blower 20 is provided to blow internal or external air into an air passage of the air conditioning case 10.

Between the evaporator 60 and the compressor 30, an accumulator 62 is further provided to separate the refrigerant introduced into the compressor 30 into a vapor phase and a liquid phase. Additionally, between the outdoor heat exchanger 48 and the evaporator 60, an internal heat exchanger 50 may be further provided to exchange heat between the refrigerant supplied to the evaporator 60 and the refrigerant returning to the compressor 30. Meanwhile, the refrigerant passing through the indoor heat exchanger 32 selectively flows to the first expansion valve 34 by a first bypass valve 36 installed parallel to the first expansion valve 34.

Furthermore, a second expansion valve 56 which selectively expands the refrigerant supplied to the evaporator 60 is provided upstream of the evaporator 60. Between the outdoor heat exchanger 48 and the second expansion valve 56, a second bypass valve 58 which is installed in parallel with the second expansion valve 56 may be further provided to selectively connect an outlet side of the outdoor heat exchanger 48 and an inlet side of the accumulator 62.

In a cooling mode, the first bypass valve 36 and the second expansion valve 56 are opened, and the first expansion valve 34 and the second bypass valve 58 are closed. The temperature door 12 opens the cold air passage. The refrigerant discharged from the compressor 30 sequentially passes through the indoor heat exchanger 32, the first bypass valve 36, the outdoor heat exchanger 48, the second expansion valve 56, the evaporator 60, and the accumulator 62, and then, returns to the compressor 30.

In a heating mode, the first bypass valve 36 and the second expansion valve 56 are closed, and the first expansion valve 34 and the second bypass valve 58 are opened. Additionally, the temperature door 12 opens the warm air passage. The refrigerant discharged from the compressor 30 sequentially passes through the indoor heat exchanger 32, the first expansion valve 34, the outdoor heat exchanger 48, the second bypass valve 58, and the accumulator 62, and then, returns to the compressor 30. In this case, the indoor heat exchanger 32 acts as a heater, and the outdoor heat exchanger 48 acts as an evaporator.

Meanwhile, during a heating dehumidification, the refrigerant is discharged from the compressor 30 and passes through the indoor heat exchanger 32. Thereafter, a portion of the refrigerant passing through the first expansion valve 34 sequentially passes through the outdoor heat exchanger 48, the second bypass valve 58, and the accumulator 62, and then, returns to the compressor 30. In addition, another portion of the refrigerant passing through the first expansion valve 34 flows to the evaporator 60 to perform dehumidification inside the interior of the vehicle.

The conventional vehicle air conditioner include an intake door 23, a blower wheel 22, and a blower motor 21 to selectively introduce internal air and external air to the blower 20. In this case, an air conditioning system having a brushless DC motor (BLDC motor) as the blower motor 21 has a disadvantage in that during the initial operation of the compressor 30, the operation of the BLDC motor is delayed for a predetermined time (about two seconds) due to the application of initial alignment and soft start compared with a DC motor.

As described above, due to the initial operation delay of the BLDC motor, there arises an issue where compressor noise occurs when the blower is ON under the operation conditions of the compressor 30. That is, since the compressor noise is not masked to a blower operating sound, the initial noise from the compressor is noticeable compared to the DC motor.

CITATION

Patent Literature

[Patent Document 1] Japanese Patent No. 3861410

DISCLOSURE

Technical Problem

Accordingly, the present invention has been made in view of the above-mentioned problems occurring in the related art, and it is an object of the present invention to provide a vehicle air conditioner and a control method therefor, which can reduce noise perceived by a user by masking the initial operating noise of an electric compressor with an operating sound of a BLDC blower motor.

Technical Solution

To accomplish the above-mentioned objects, according to the present invention, there is provided a vehicle air conditioner, which performs cooling and heating of an interior space of a vehicle using a refrigerant line including a compressor, an outdoor heat exchanger, expansion means, and an evaporator, and includes a blower wheel and a blower motor rotating the blower wheel to blow air to the interior space of the vehicle, further including: a control unit which delays the operation of the compressor until the blower motor reaches a minimum RPM when the compressor is in a driving condition while the blower motor is turned on.

The control unit receives RPM information from the blower motor, and sends an ON signal of the compressor to operate the compressor when the RPM of the blower motor reaches or exceeds a first threshold value.

The control unit sends an OFF signal to stop the compressor when the RPM of the blower motor is a second threshold value or below.

The blower motor is a BLDC motor, and the compressor is an electric compressor.

The first threshold value is greater than the second threshold value.

In another aspect of the present invention, there is provided a control method for a vehicle air conditioner, which performs cooling and heating of an interior space of a vehicle using a refrigerant line including a compressor, an outdoor heat exchanger, expansion means, and an evaporator, and includes a blower wheel and a blower motor rotating the blower wheel to blow air to the interior space of the vehicle, including: delaying the operation of the compressor until the blower motor reaches a minimum RPM when the compressor is in a driving condition while the blower motor is turned on.

The control method for the vehicle air conditioner includes: a step of operating an air conditioning system; a step of determining whether the compressor is in a driving condition; a step of sending an ON signal to operate the blower motor if the compressor is in the driving condition; a step of comparing the RPM of the blower motor with a first threshold value; and a step of sending an ON signal to operate the compressor if the RPM of the blower motor is the first threshold value or more.

After the step of sending the ON signal to operate the compressor, the control method further includes: a step of comparing the RPM of the blower motor with a second threshold value; and a step of sending an OFF signal to stop the compressor if the RPM of the blower motor is the second threshold value or below.

The control method further includes a step of, if the RPM of the blower motor is below the first threshold value, sending an OFF signal to stop the compressor.

If the RPM of the blower motor exceeds the second threshold value, the operation of the compressor remains ON.

Advantageous Effect

According to an embodiment of the present invention, the vehicle air conditioner and the control method therefor can effectively reduce noise perceived by the user by masking the initial operating noise of an electric compressor with an operating sound of a BLDC blower motor.

MODE FOR INVENTION

Figure 1:
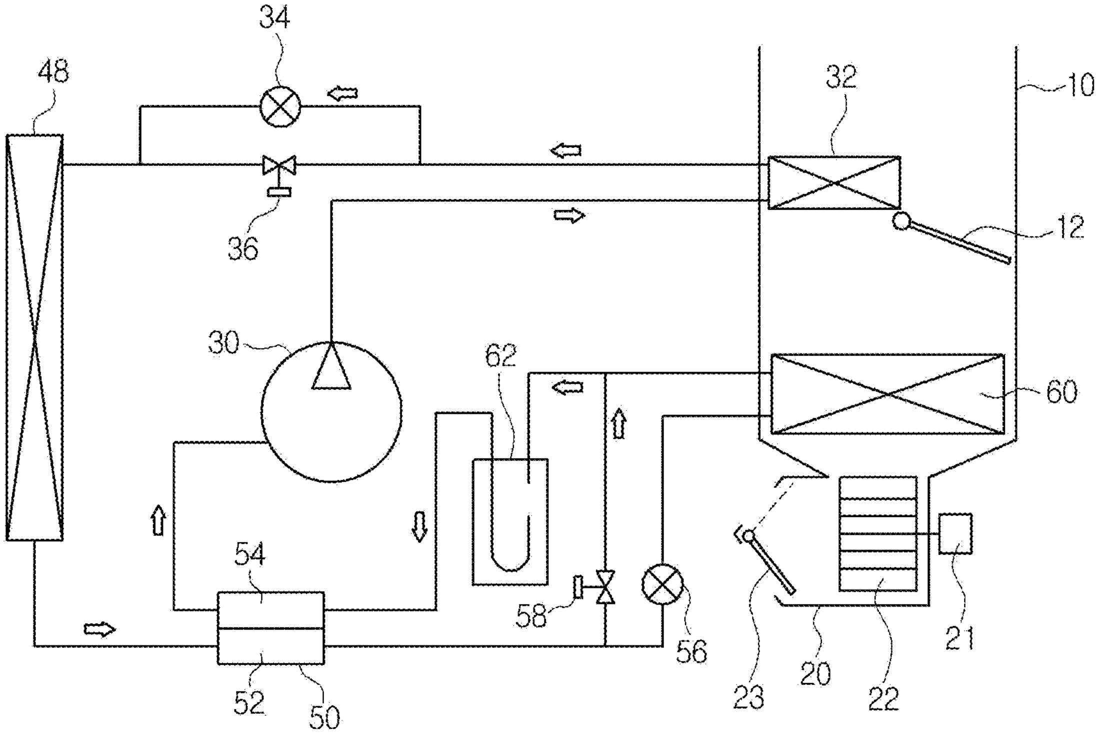
FIG. 1 illustrates a conventional heat pump system for a vehicle.
Figure 2:
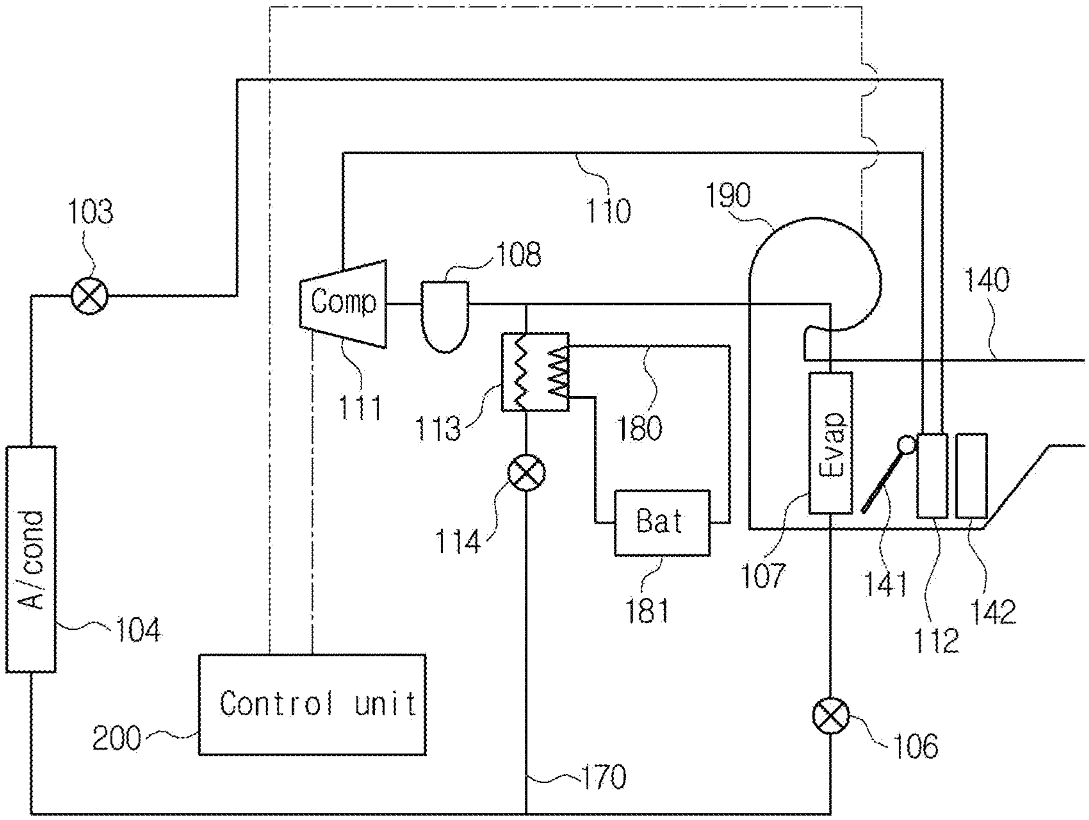
FIG. 2 illustrates a configuration of a vehicle air conditioner according to an embodiment of the present invention.
Figure 3:
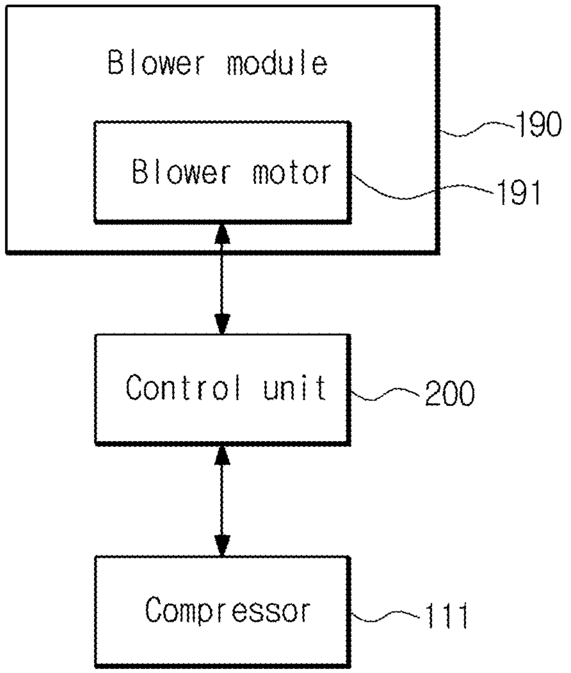
FIG. 3 is a schematic diagram illustrating a configuration of a control unit of the vehicle air conditioner according to an embodiment of the present invention.

Hereinafter, referring to attached drawings, technical configurations of a vehicle air conditioner and a control method therefor according to an embodiment of the present invention will be described in detail as follows.

Referring to FIGS. 2 to 7, a vehicle air conditioner according to an embodiment of the present invention is a heat pump system installed in an electric Vehicle (EV) or the like, and is configured to cool and heat an interior space of the vehicle using a refrigerant line 110. The vehicle air conditioner includes a refrigerant line 110 and a coolant line 180. The refrigerant line 110 includes a compressor 111, an outdoor heat exchanger 104, an expansion means, and an evaporator 107.

More specifically, the compressor 111, an indoor heat exchanger 112, a first expansion valve 103, the outdoor heat exchanger 104, a second expansion valve 106, the evaporator 107, and an accumulator 108 are sequentially provided in the refrigerant line 110. The compressor 111 compresses the refrigerant and discharges the refrigerant in a high-temperature and high-pressure state. In this case, the compressor 111 is an electric compressor. The indoor heat exchanger 112 is installed inside an air conditioning case 140, and heats the interior by exchanging heat between the air and the refrigerant discharged from the compressor 111.

The evaporator 107 and the indoor heat exchanger 112 are sequentially installed in an air flow direction inside the air conditioning case 140. A blower module 190 for blowing air is provided in an air passage inside the air conditioning case 140. The blower module 190 includes a blower wheel and a blower motor 191. The blower wheel is for blowing air into the interior space of the vehicle, and the blower motor 191 is connected to the blower wheel to rotate the blower wheel.

Between the evaporator 107 and the indoor heat exchanger 112, a temperature door 141 is provided to control the temperature of the air discharged into the interior space of the vehicle. The temperature door 141 adjusts the air volume between a cold air passage and a warm air passage while rotating within the air conditioning case 140. A PTC heater 142, which is an electric heater generating heat according to power application is provided downstream of the indoor heat exchanger 112 in the air flow direction.

The first expansion valve 103 is positioned between the indoor heat exchanger 112 and the outdoor heat exchanger 104, and selectively expands the refrigerant or allows the refrigerant to pass through without expansion. The outdoor heat exchanger 104 is located downstream of the first expansion valve 103 in a refrigerant flow direction, and exchanges heat with the outdoor air. The second expansion valve 106 is positioned upstream of the evaporator 107 in the refrigerant flow direction, and functions to expand the refrigerant. The evaporator 107 is installed within the air conditioning case 140, and cools the interior by exchanging heat between the refrigerant and the air.

An evaporator bypass line 170 is provided in the refrigerant line 110. The evaporator bypass line 170 branches between the outdoor heat exchanger 104 and the second expansion valve 106, and is connected to the refrigerant line between the evaporator 107 and the accumulator 108. The evaporator bypass line 170 allows the refrigerant passing through the outdoor heat exchanger 104 to bypass the evaporator 107. A third expansion valve 114 and a chiller 113 are sequentially provided in the evaporator bypass line 170. The chiller 113 exchanges heat with the coolant of the coolant line 180 circulating through a battery 181.

Figure 4:
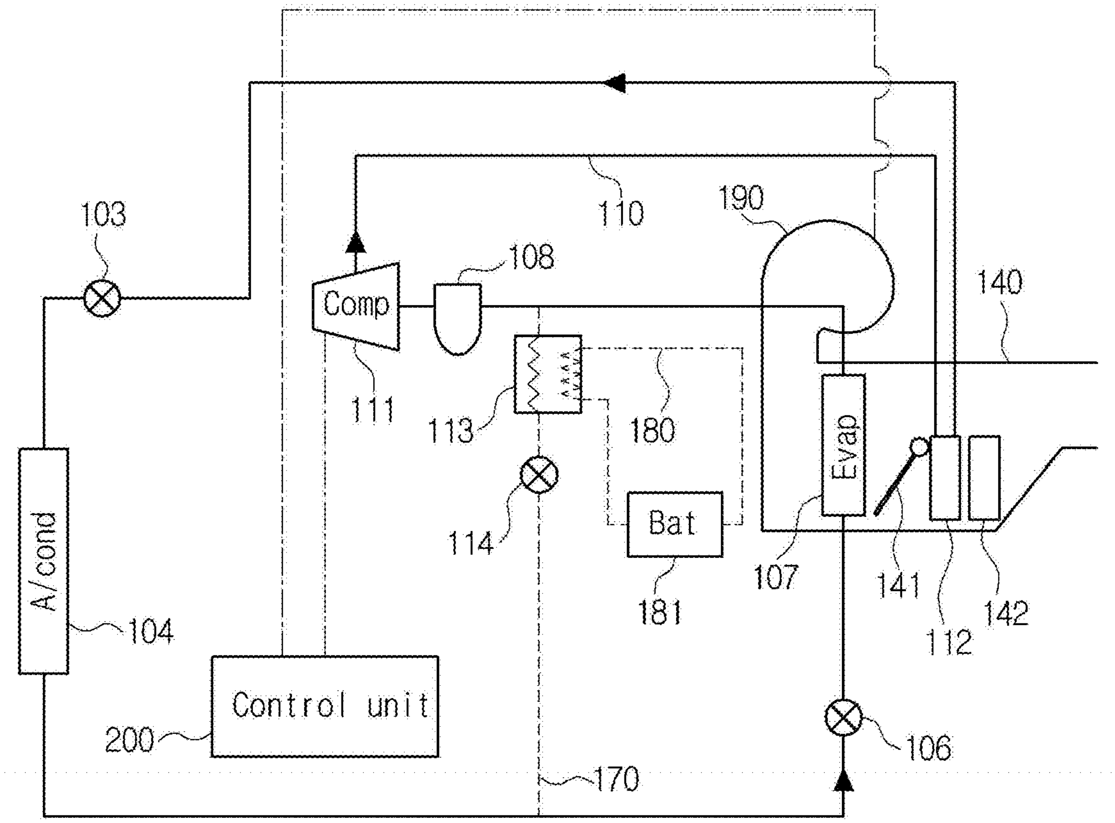
FIG. 4 illustrates a cooling mode of the vehicle air conditioner according to an embodiment of the present invention.

In a cooling mode, as illustrated in FIG. 4, the high-temperature and high-pressure refrigerant discharged from the compressor 111 sequentially passes through the indoor heat exchanger 112, the first expansion valve 103, and the outdoor heat exchanger 104, and then, is condensed. Furthermore, the refrigerant passing through the outdoor heat exchanger 104 is expanded by the second expansion valve 106, absorbs heat in the evaporator 107, passes through the accumulator 108, and then, circulates through the compressor 111. The air passing through the evaporator 107 is cooled by heat exchange with the refrigerant, thereby performing interior cooling.

Figure 5:
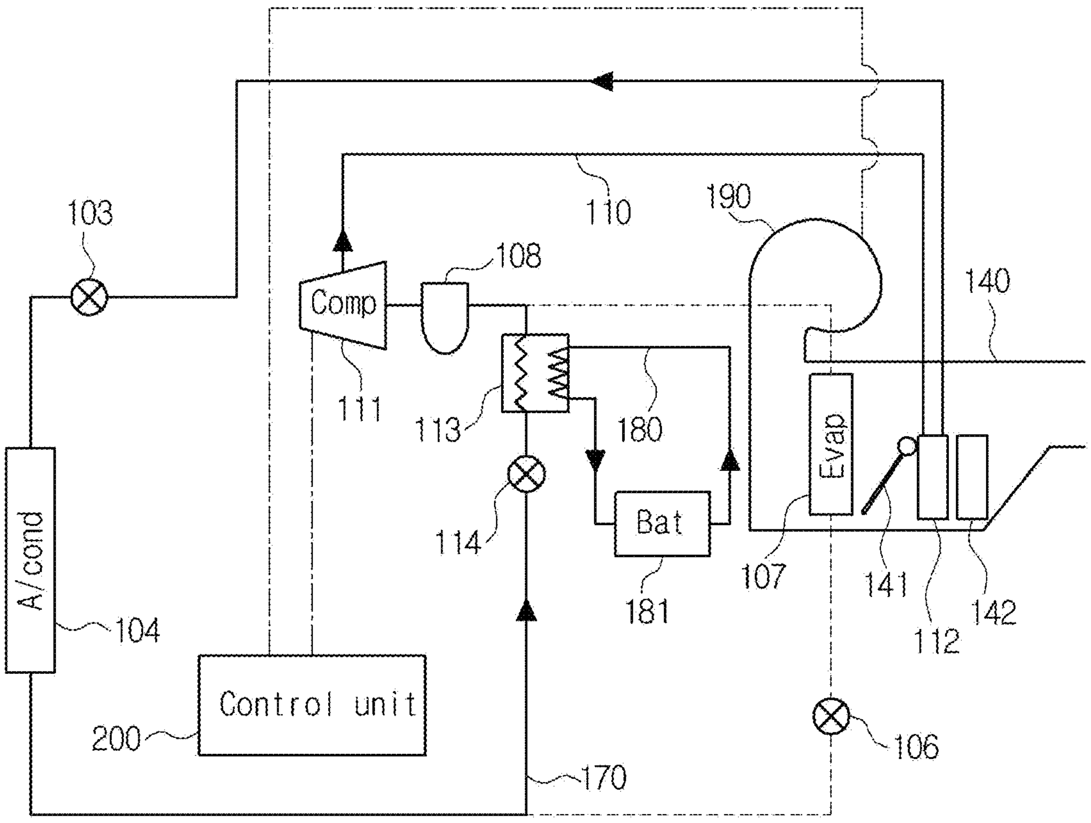
FIG. 5 illustrates a heating mode of the vehicle air conditioner according to an embodiment of the present invention.
Figure 6:
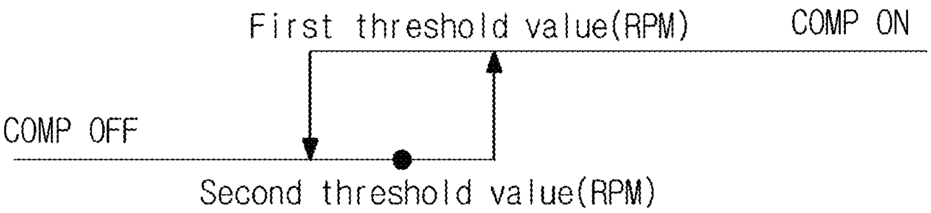
FIG. 6 is a schematic diagram illustrating an operation example of the control unit of the vehicle air conditioner according to an embodiment of the present invention.
Figure 7:
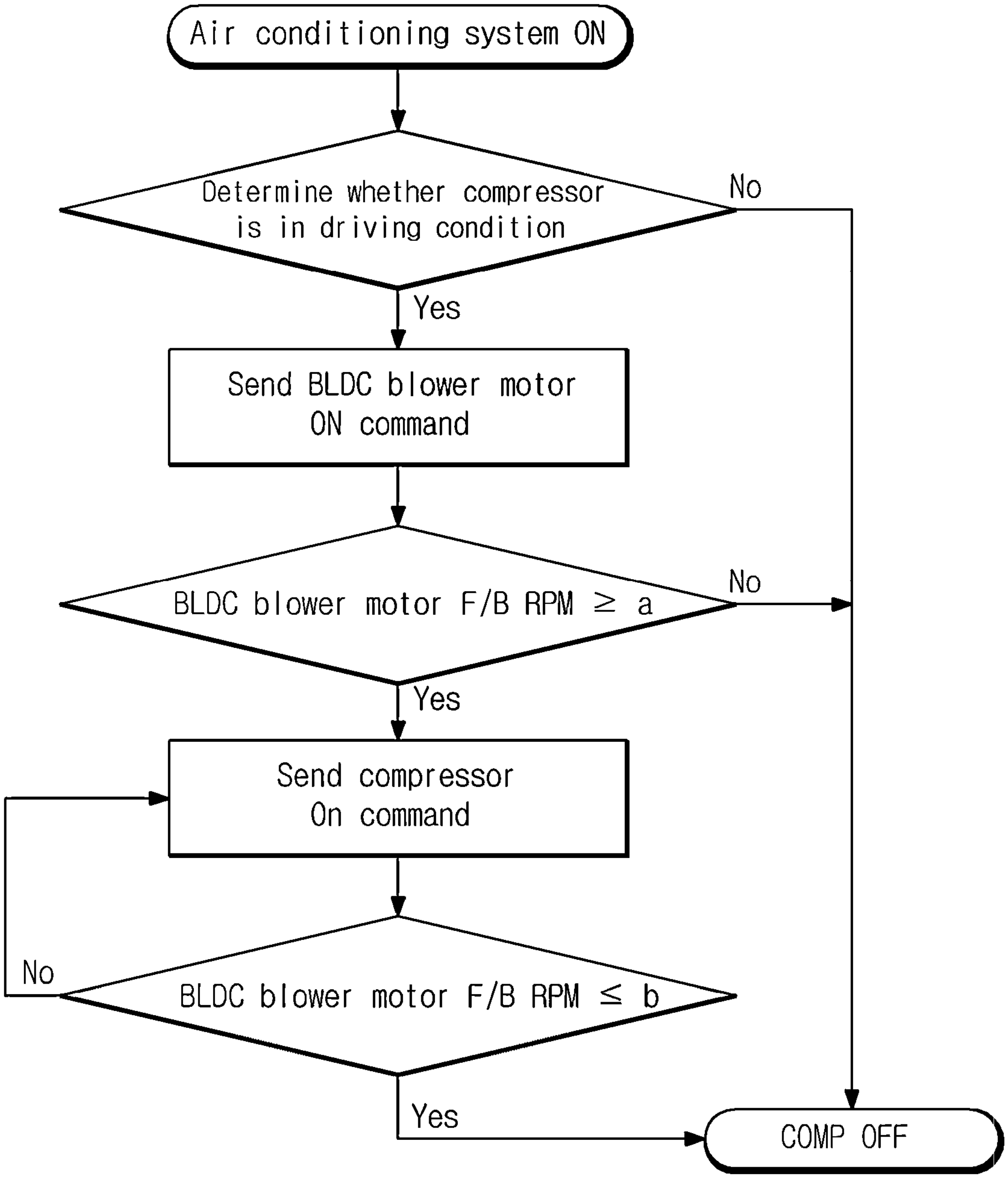
FIG. 7 is a flowchart showing a control method of the vehicle air conditioner according to an embodiment of the present invention.

In a heating mode, as illustrated in FIG. 5, the high-temperature and high-pressure refrigerant discharged from the compressor 111 exchanges heat with the indoor air while passing through the indoor heat exchanger 112, thereby performing interior heating. Additionally, the refrigerant passing through the indoor heat exchanger 112 is expanded while passing through the first expansion valve 103, and recovers an air heat source while passing through the outdoor heat exchanger 104. The refrigerant passing through the outdoor heat exchanger 104 bypasses the evaporator 107 via the evaporator bypass line 170, directly passes through the third expansion valve 114, absorbs waste heat in the chiller 113, passes through the accumulator 108, and then, circulates through the compressor 111.

Meanwhile, the vehicle air conditioner includes a control unit 200. The blower motor 191 of the vehicle air conditioner according to an embodiment of the present invention is a brushless DC motor (BLDC motor). The control unit 200 delays the operation of the compressor 111 until the blower motor 191 reaches a minimum RPM when the compressor 111 is in a driving condition while the blower motor 191 is turned on.

That is, the control unit 200 receives RPM information from the blower motor 191, and sends an ON signal of the compressor 111 to operate the compressor 111 when the RPM of the blower motor 191 reaches or exceeds a first threshold value (a). Accordingly, the vehicle air conditioner can reduce noise perceived by a passenger by masking the initial operating noise of the compressor 111 with an operating sound of the BLDC blower motor 191.

Furthermore, the control unit 200 sends an OFF signal of the compressor 111 to stop the compressor 111 when the RPM of the blower motor 191 falls below a second threshold value (b). In this case, the first threshold value (a) is higher than the second threshold value (b). Additionally, the OFF condition for the compressor 111 can be appropriately set depending on the operable RPM range of the BLDC blower motor 191.

Meanwhile, a control method for the vehicle air conditioner according to an embodiment of the present invention delays the operation of the compressor 111 until the blower motor 191 reaches a minimum RPM when the compressor 111 is in a driving condition while the blower motor 191 is turned on.

That is, the control method for the vehicle air conditioner according to an embodiment of the present invention includes a step of operating an air conditioning system, a step of determining whether the compressor 111 is in a driving condition, a step of sending an ON signal to operate the blower motor 191 if the compressor 111 is in the driving condition, a step of comparing the RPM of the blower motor 191 with a first threshold value (a), a step of sending an ON signal to operate the compressor 111 if the RPM of the blower motor 191 is the first threshold value (a) or more, a step of comparing the RPM of the blower motor 191 with a second threshold value (b), and a step of sending an OFF signal to stop the compressor 111 if the RPM of the blower motor 191 is the second threshold value (b) or below.

In this case, if the RPM of the blower motor 191 is below the first threshold value (a), the step of sending the OFF signal to stop the compressor 111 is performed. Furthermore, if the RPM of the blower motor 191 exceeds the second threshold value (b), the operation of the compressor 111 remains ON.

First, the air conditioning system is turned ON to initiate a series of control logic. Thereafter, the control unit 200 determines whether the compressor 111 is currently in the driving condition. If the compressor 111 is not in the driving condition, the compressor 111 is in a stop state, so the control logic ends. If the compressor 111 is in the driving condition, the control unit 200 sends an ON signal to operate the blower motor 191.

Thereafter, the control unit 200 compares the RPM of the blower motor 191 with the first threshold value (a). If the RPM of the blower motor 191 is below the first threshold value (a), the control unit 200 sends the OFF signal to the compressor 111 to stop the compressor 111, so the control logic ends. If the RPM of the blower motor 191 is the first threshold value (a) or more, the control unit 200 sends the ON signal to the compressor 111 to operate the compressor 111.

Thereafter, the control unit 200 compares the RPM of the blower motor 191 with the second threshold value (b). If the RPM of the blower motor 191 is the second threshold value (b) or below, the control unit 200 sends the OFF signal to the compressor 111 to stop the compressor 111, so the control logic ends. If the RPM of the blower motor 191 exceeds the second threshold value (b), the operation of the compressor 111 remains ON.

In summary, when the air conditioning system is turned on (the blower motor is turned on) and the compressor 111 is in the driving condition, the vehicle air conditioner according to an embodiment of the present invention starts the control logic to mask the initial noise of the compressor 111 with the operating sound of the blower motor 191. If the RPM of the BLDC blower motor 191 is the first threshold value (a) or more, the vehicle air conditioner set the condition to operate the compressor 111, thereby delaying the operation of the compressor 111.

In addition, if the RPM of the blower motor 191 is the second threshold value (b) or below, the compressor 111 is stopped. Additionally, when ignition is in an on state within a hysteresis section, turning-off of the compressor 111 is preferentially performed. Meanwhile, the series of control logic of the present invention is not applied in a battery cooling only condition. That is, in the battery cooling only condition, since the blower motor 191 is not operated, there is no need for delaying the operation of the compressor 111.

Through the control logic of the present invention, the initial operating noise of the compressor can be significantly reduced. The BLDC blower motor takes a long time to perform initial operation compared to the DC blower motor, so the noise of the compressor is more noticeable to the passenger. When the air conditioning system is ON and the compressor is in the driving condition, the compressor is driven after the BLDC blower motor reaches the minimum RPM, thereby reducing noise perceived by the passenger by masking the initial operating noise of the compressor with the operating sound of the BLDC blower motor.

The control unit determines the RPM of the BLDC blower motor and utilizes the determination information to delay the compressor. In this case, if the feedback (F/B) RPM of the BLDC blower motor can be detected, the determination is made using the feedback value. If the control unit cannot detect the feedback of the BLDC blower motor, the determination is made based on a target RPM. That is, if the RPM of the BLDC blower motor cannot be determined, the control unit estimates the time to reach the minimum blower motor RPM and makes the determination based on time.

While the vehicle air conditioner and the control method therefor of the present invention have been described with reference to the illustrated embodiments, the descriptions are exemplary only, and it will be understood by those skilled in the art that various modifications and equivalents of the embodiments are possible. Therefore, the true technical protection scope should be defined by the technical spirit of the appended claims.

The invention claimed is:

1. A vehicle air conditioner, which performs cooling and heating of an interior space of a vehicle using a refrigerant line including a compressor, an outdoor heat exchanger, an expansion valve, and an evaporator, and includes a blower wheel and a blower motor rotating the blower wheel to blow air to the interior space of the vehicle, the vehicle air conditioner comprising:

a control unit which is configured to delay the operation of the compressor until the blower motor reaches a minimum RPM when the compressor is in a driving condition while the blower motor is turned on, wherein the control unit is configured to receive RPM information from the blower motor, and send an ON signal of the compressor to operate the compressor when the RPM of the blower motor reaches or exceeds a first threshold value.

2. The vehicle air conditioner according to claim 1, wherein the control unit is configured to send an OFF signal to stop the compressor when the RPM of the blower motor is a second threshold value or below.

3. The vehicle air conditioner according to claim 2, wherein the first threshold value is greater than the second threshold value.

4. The vehicle air conditioner according to claim 2, wherein the blower motor is a BLDC motor, and the compressor is an electric compressor.

5. The vehicle air conditioner according to claim 4, wherein the first threshold value is greater than the second threshold value.

6. The vehicle air conditioner according to claim 1, wherein the blower motor is a BLDC motor, and the compressor is an electric compressor.

7. A control method for a vehicle air conditioner, which performs cooling and heating of an interior space of a vehicle using a refrigerant line including a compressor, an outdoor heat exchanger, an expansion valve, and an evaporator, and includes a blower wheel and a blower motor rotating the blower wheel to blow air to the interior space of the vehicle, the method comprising:

a step of operating an air conditioning system;

a step of determining whether the compressor is in a driving condition;

a step of sending an ON signal to operate the blower motor if the compressor is in the driving condition;

a step of comparing the RPM of the blower motor with a first threshold value;

a step of sending an ON signal to operate the compressor if the RPM of the blower motor is the first threshold value or more; and delaying the operation of the compressor until the blower motor reaches a minimum RPM when the compressor is in a driving condition while the blower motor is turned on.

8. The control method according to claim 7, after the step of sending the ON signal to operate the compressor, further comprising:

a step of comparing the RPM of the blower motor with a second threshold value; and a step of sending an OFF signal to stop the compressor if the RPM of the blower motor is the second threshold value or below.

9. The control method according to claim 8, wherein if the RPM of the blower motor exceeds the second threshold value, the operation of the compressor remains ON.

10. The control method according to claim 7, further comprising:

a step of, if the RPM of the blower motor is below the first threshold value, sending an OFF signal to stop the compressor.

* * * * *